United States Patent
Mangarella

(10) Patent No.: US 12,063,239 B2
(45) Date of Patent: Aug. 13, 2024

(54) HUMAN OR BOT ACTIVITY DETECTION

(71) Applicant: HUMAN SECURITY, INC., New York, NY (US)

(72) Inventor: Michael Mangarella, Sandy Hook, CT (US)

(73) Assignee: HUMAN SECURITY, INC., New York, NY (US)

( * ) Notice: Subject to any disclaimer, the term of this patent is extended or adjusted under 35 U.S.C. 154(b) by 234 days.

(21) Appl. No.: 17/751,204

(22) Filed: May 23, 2022

(65) Prior Publication Data

US 2023/0379348 A1 Nov. 23, 2023

(51) Int. Cl.
*H04L 9/40* (2022.01)
*G06N 20/00* (2019.01)

(52) U.S. Cl.
CPC ......... *H04L 63/1425* (2013.01); *G06N 20/00* (2019.01); *H04L 63/1416* (2013.01)

(58) Field of Classification Search
CPC ............. H04L 63/1425; H04L 63/1416; H04L 2463/144; G06N 20/00
See application file for complete search history.

(56) References Cited

U.S. PATENT DOCUMENTS

| | | | |
|---|---|---|---|
| 10,069,852 B2 | 9/2018 | Turgeman et al. | |
| 11,386,349 B1* | 7/2022 | Prisadnikov | G06N 20/00 |
| 11,443,237 B1* | 9/2022 | Song | G06N 20/00 |
| 2018/0247321 A1* | 8/2018 | Crabtree | G06Q 30/0242 |
| 2019/0025771 A1* | 1/2019 | Park | G06F 16/9024 |
| 2019/0245876 A1* | 8/2019 | Faigon | H04L 63/1416 |
| 2019/0361412 A1* | 11/2019 | Park | G06N 20/00 |
| 2020/0106633 A1* | 4/2020 | Park | H04L 12/2827 |
| 2020/0143795 A1* | 5/2020 | Park | G10L 25/63 |
| 2020/0349647 A1* | 11/2020 | Crabtree | G06F 16/951 |
| 2021/0117455 A1* | 4/2021 | Rogynskyy | G06F 16/906 |
| 2021/0258349 A1* | 8/2021 | Crabtree | H04L 63/1425 |
| 2021/0281609 A1* | 9/2021 | Crabtree | H04L 63/1425 |
| 2022/0019451 A1* | 1/2022 | Crabtree | G06N 20/00 |
| 2022/0060453 A1* | 2/2022 | Crabtree | H04L 63/1425 |
| 2022/0067738 A1* | 3/2022 | Fang | H04L 9/3297 |
| 2023/0097330 A1* | 3/2023 | Wang | G06F 16/958 707/722 |

* cited by examiner

*Primary Examiner* — Richard G Keehn
(74) *Attorney, Agent, or Firm* — SQUIRE PATTON BOGGS (US) LLP

(57) ABSTRACT

Systems, methods, apparatuses, and computer program products for human or bot activity detection. The method may include, collecting time-series data on one or more events occurring on a webpage. The method may also include deriving classifications of the one or more events. The method may further include performing functional transformations of the time-series data. In addition, the method may include determining potential features of the one or more events based on a combination of the classifications of the one or more events, and results of the functional transformation. Further, the method may include training a machine learning model with the potential features. The method may also include determining, via the machine learning model, bot behavior and non-bot behavior of the one or more events.

15 Claims, 11 Drawing Sheets

Part 3: Model Training and Validation

Training

700

| Label | Mean(Time) | Count(mouse) |
|---|---|---|
| Trashy | 5 | 10 |
| Trusted | 10 | 20 |

Selected Features and Trusted/Trashy Traffic Labels

Trained Machine Learning Model

Validation

705

Trained Machine Learning Model

| Label | Mean(Time) | Count(mouse) |
|---|---|---|
| Bot | 15 | 20 |
| Not Bot | 12 | 30 |

Selected Features and Bot/Not Bot Labels

Validation Metrics

| | |
|---|---|
| No events | `document.getElementsByName("username")[0].value = 'lkdfhgkfhgkjfhkj';` |
| Random delays | ```
case ElementAction.SendKeysHuman:
    var toSend = ReplaceValues(input, data);
    var rand = new Random();
    foreach(char c in toSend) {
        element.SendKeys(c.ToString());
        Thread.Sleep(rand.Next(100, 300));
    }
``` |
| Chrome dev protocol (no webdriver signal) | ```
await this._client.send('Page.dispatchKeyEvent', {
    type: 'keydown',
    keyCode: keyCodeWithoutLocation,
    code,
    key,
    repeat: autoRepeat,
    location,
    text,
});
``` |

FIG. 2

| Data point | Human | Bot |
|---|---|---|
| Mouse movement | Slow | Fast & precise |
| Typing speed | Slow | Fast |
| Keypress duration | Long | Short |
| Backspace | Yes | No |
| Tabbing | Yes | No / unlikely |
| Autofill Pwd manager | Yes | no / unlikely |

FIG. 3C

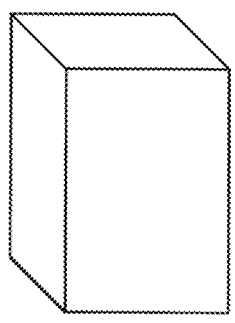
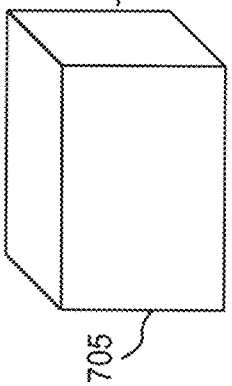
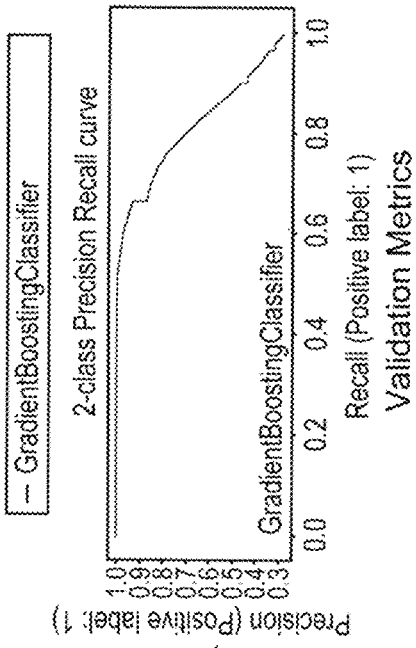
FIG. 7

HUMAN OR BOT ACTIVITY DETECTION

FIELD

Some example embodiments may generally relate to malicious or bot activity detection. For example, certain example embodiments may relate to apparatuses, systems, and/or methods for human or bot activity detection.

BACKGROUND

Online security, including online form security, may relate to the process of developing, adding, and testing security features within such forms to prevent security vulnerabilities against threats, such as unauthorized modification and/or malicious activity or behavior. Online form security is an important feature because forms may often be available over various networks and connected to the cloud, increasing vulnerabilities to security threats. Thus, there continues to be an increasing need to not only ensure security at the network level, but also within online forms themselves.

SUMMARY

Some example embodiments may be directed to a method. The method may include collecting time-series data on one or more events occurring on a webpage. The method may also include deriving classifications of the one or more events. The method may further include performing functional transformations of the time-series data. In addition, the method may include determining potential features of the one or more events based on a combination of the classifications of the one or more events, and results of the functional transformation. Further, the method may include training a machine learning model with the potential features. The method may also include determining, via the machine learning model, bot behavior and non-bot behavior of the one or more events.

Other example embodiments may be directed to an apparatus. The apparatus may include at least one processor and at least one memory including computer program code. The at least one memory and computer program code may also be configured to, with the at least one processor, cause the apparatus at least to collect time-series data on one or more events occurring on a webpage. The apparatus may also be caused to derive classifications of the one or more events. The apparatus may further be caused to perform functional transformations of the time-series data. In addition, the apparatus may be caused to determine potential features of the one or more events based on a combination of the classifications of the one or more events, and results of the functional transformation. Further, the apparatus may be caused to train a machine learning model with the potential features. The apparatus may also be caused to determine, via the machine learning model, bot behavior and non-bot behavior of the one or more events.

Other example embodiments may be directed to an apparatus. The apparatus may include means for collecting time-series data on one or more events occurring on a webpage. The apparatus may also include means for deriving classifications of the one or more events. The apparatus may further include means for performing functional transformations of the time-series data. In addition, the apparatus may include means for determining potential features of the one or more events based on a combination of the classifications of the one or more events, and results of the functional transformation. Further, the apparatus may include means for training a machine learning model with the potential features. The apparatus may also include means for determining, via the machine learning model, bot behavior and non-bot behavior of the one or more events.

In accordance with other example embodiments, a non-transitory computer readable medium may be encoded with instructions that may, when executed in hardware, perform a method. The method may include collecting time-series data on one or more events occurring on a webpage. The method may also include deriving classifications of the one or more events. The method may further include performing functional transformations of the time-series data. In addition, the method may include determining potential features of the one or more events based on a combination of the classifications of the one or more events, and results of the functional transformation. Further, the method may include training a machine learning model with the potential features. The method may also include determining, via the machine learning model, bot behavior and non-bot behavior of the one or more events.

Other example embodiments may be directed to a computer program product that performs a method. The method may include collecting time-series data on one or more events occurring on a webpage. The method may also include deriving classifications of the one or more events. The method may further include performing functional transformations of the time-series data. In addition, the method may include determining potential features of the one or more events based on a combination of the classifications of the one or more events, and results of the functional transformation. Further, the method may include training a machine learning model with the potential features. The method may also include determining, via the machine learning model, bot behavior and non-bot behavior of the one or more events.

Other example embodiments may be directed to an apparatus that may include circuitry configured to collect time-series data on one or more events occurring on a webpage. The apparatus may also include circuitry configured to derive classifications of the one or more events. The apparatus may further include circuitry configured to perform functional transformations of the time-series data. In addition, the apparatus may include circuitry configured to determine potential features of the one or more events based on a combination of the classifications of the one or more events, and results of the functional transformation. Further, the apparatus may include circuitry configured to train a machine learning model with the potential features. The apparatus may also include circuitry configured to determine, via the machine learning model, bot behavior and non-bot behavior of the one or more events.

BRIEF DESCRIPTION OF THE DRAWINGS

For proper understanding of example embodiments, reference should be made to the accompanying drawings, wherein:

FIG. 2 illustrates example inputs of form filling bots, according to certain example embodiments.

FIG. 3C illustrates a table of example human and bot behaviors, according to certain example embodiments.

FIG. 7 illustrates an example model training and validation procedure, according to certain example embodiments.

DETAILED DESCRIPTION

Figure 1:
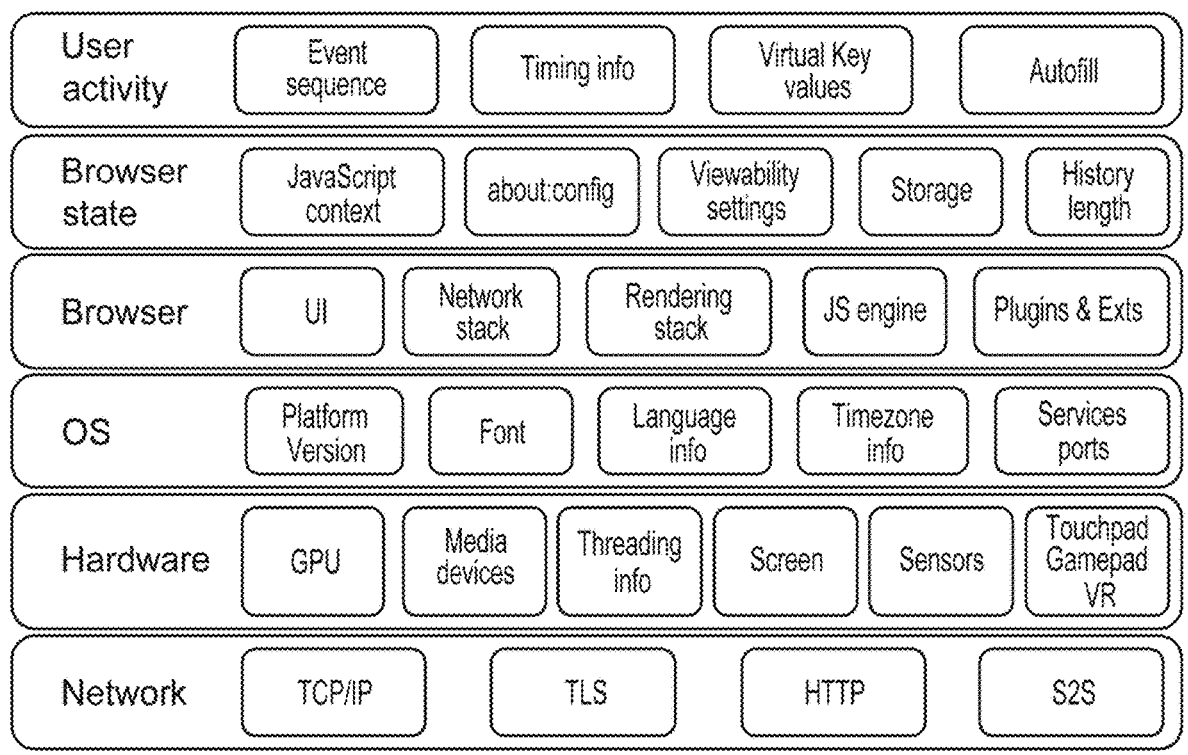
FIG. 1 illustrates an example signal hierarchy, according to certain example embodiments.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for human or bot activity detection.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

Certain example embodiments may relate to activity detected in online forms. For instance, certain example embodiments, may relate to logging the activity happening in the form. In other example embodiments, various event types (4 bits), key status (3 bits), metadata (3 bits), and timing information (10 bits) may be recorded, leaving 4 bits unused for expansion. According to certain example embodiments, the event types may include mouse events, keyboard events, and input events. In certain example embodiments, the mouse events may include a mouseup event, a mousedown event, a mouseenter operation, a mouseout event, a mouseover event, and a click operation. In other example embodiments, the keyboard events may include a key-down operation and a key-up operation.

According to certain example embodiments, the mouseenter event may be fired at an element when a pointing device (e.g., a mouse) is initially moved so that its hotspot is within the element at which the event was fired. The mouseout event may be fired at an element when a pointing device (e.g., a mouse) is used to move the cursor so that it is no longer contained within the element or one of its children. Further, the mouseover event may be fired at an element when a pointing device (e.g., a mouse or trackpad) is used to move the cursor onto the element or one of its child elements. The mouseup event may be fired at an element when a button on a pointing device (e.g., a mouse or trackpad) is released while the pointer is located inside it. The mousedown event may be fired at an element when a pointing device button is pressed while the pointer is inside the element.

In some example embodiments, the input events may include a paste operation, a select operation, and an input operation. In other example embodiments, the keyboard events may include key status, which may be collected. The key status may be printable, ALT, CTRL, or shift. According to certain example embodiments, the printable characters may include letters, digits, and special punctuation such as commas, brackets, and question marks, whereas unprintable characters may correspond to codes that indicate a special function such as a line feed, tab, or carriage return. In certain example embodiments, for security reasons, no printable characters may be stored.

According to certain example embodiments, the events may be stored as bits. For instance, in some example embodiments, bit 1 may be for trusted attributes, and bits 2-3 may be for input types. According to certain example embodiments, the 2-3 bit input types may be present when the recorded event is related to input events such as, for example, paste, select, or input. In some example embodiments, the input event attribute(s) may be collected based on its major category types, which may be "insert", "delete", "history", or "format". In other example embodiments, each event may occupy 3 bytes before encoding, and 4 bytes in transit as a Base64 string.

In certain example embodiments, the events may be aggregated into arrays. For instance, according to some example embodiments, the events may be aggregated into a 2D array of event types versus key status (i.e., for a given event X, how many times was the key status Y fired). In certain example embodiments, the information contained in the aggregated 2D array may be fed into a machine learning or statistical system which may perform a type of sequence analysis to determine whether this is classified as typical human behavior or bot behavior. According to other example embodiments, the events may be aggregated into a 2D array of event types versus isTrusted property (i.e., for a given event X, how many times was the isTrusted event fired). The isTrusted property may be a read-only property of the event interface. The isTrusted property may also be a Boolean value that is true when the event was generated by a user action, and false when the event was created or modified by a script or dispatched via EventTarget.dispatchEvent( ). Further, in certain example embodiments, the isTrusted property may not be fired by a normal user interaction. Instead, the isTrusted property may be caused by a script code. While sometimes a good bot may cause this, the majority of the events with this flag set to false (i.e., not trusted) may be caused by malicious bots.

In some example embodiments, the events may be aggregated in a 2D array of event types and delta between that event and the previous event regardless of its type (i.e., for a given event X, how many milliseconds passed until another event occurred). According to certain example embodiments, the amount of time (e.g., milliseconds, seconds, etc.) may serve as a metric indicator to determine a point at which this type of operation would be classified as malicious or bot behavior. For instance, in some example embodiments, the events firing with a short time delta between them may distinguish normal user activity versus a bot mimicking a human. For example, in certain example embodiments, the time between firing two key-down events for a human may be 0.2 seconds to 0.4 seconds, while for a bot, the time may be much lower/faster, closer to zero to 0.05 seconds.

It is noted that, as referred to herein, bot behavior or bot traffic may refer to non-human and/or malicious behavior or traffic.

FIG. 1 illustrates an example signal hierarchy, according to certain example embodiments. For instance, the example signal hierarchy may define various categories of user activity, browser state, operation system, hardware and network. The example signal hierarchy may also be directed to a browser session with JavaScript enabled. As illustrated in FIG. 1, categories that may define the user activity may include event sequence, timing information, virtual key values, and autofill. According to certain example embodiments, the event sequence of user activity may correspond to a sequence of events performed by the user such as, for example, mouse operations, keyboard operations, and/or input operations. According to some example embodiments, the timing information may be defined as a measurable period of time between each event, and the virtual key values may correspond to virtual keys that enable, authorize, or grant the user to access certain locked/secured information. According to other example embodiments, the timing information may be a maximum of 1024 ms between events that are collected. In some example embodiments, when the timing information is more than 1024 ms, it may be treated as 1024 ms. In other example embodiments, the autofill may correspond to a function that automatically prefills a field or space in a computer application(s) or program(s) which may contain forms.

As further illustrated in FIG. 1, according to certain example embodiments, the browser state may be defined with various features including, for example, JavaScript context, about:config, viewability settings, storage, and history length. Furthermore, the browser of certain example embodiments may be defined with a user interface (UI), network stack, rendering stack, JavaScript (JS) engine, and plugins and exts. In some example embodiments, the network stack (i.e., protocol stack) may provide an implementation of a computer networking protocol suite or protocol family Individual protocols within a suite may be designed with a specific purpose. Furthermore, the suite may define the communication protocols, and the stack may correspond to the software implementation of such protocols. This modularization may provide a simplified design and evaluation. Since each protocol module may communicate with two others, they may commonly be imaged as layers in a stack of protocols. Additionally, the lowest protocol may deal with low-level interaction with the communications hardware, and each higher layer may add additional capabilities.

The signal hierarchy may also include an operating system (OS), which may include categories of a platform version, a font, language information, time zone information, and services ports. In addition, the signal hierarchy may define hardware, which may include a graphics processing unit (GPU), media devices, threading information, screen, sensors, and touchpad, gamepad, or virtual reality (VR). The signal hierarchy may further define a network, which may include transmission control protocol (TCP)/internet protocol (IP), transport layer security (TLS), hypertext transfer protocol (HTTP), and server-to-server (S2S).

FIG. 2 illustrates example inputs of form filling bots, according to certain example embodiments. The example inputs may relate to no events, random delays, or Chrome deviation protocol (no web driver signal), for example. Additionally, FIG. 2 illustrates three ways for a bot to enter data into a form (e.g., a login form). In a first method, there may be no typing, and the actions may just involve manipulation of the field directly with the desired value. In a second method, the keyboard events may be fired, and a random delay between 100 ms and 300 ms may be added between key presses to mimic normal user activity. In a third method, the Chrome Dev Protocol may be used, which may be on more native than JavaScript to the operating system and, thus, may be harder to discover.

Figure 3A:
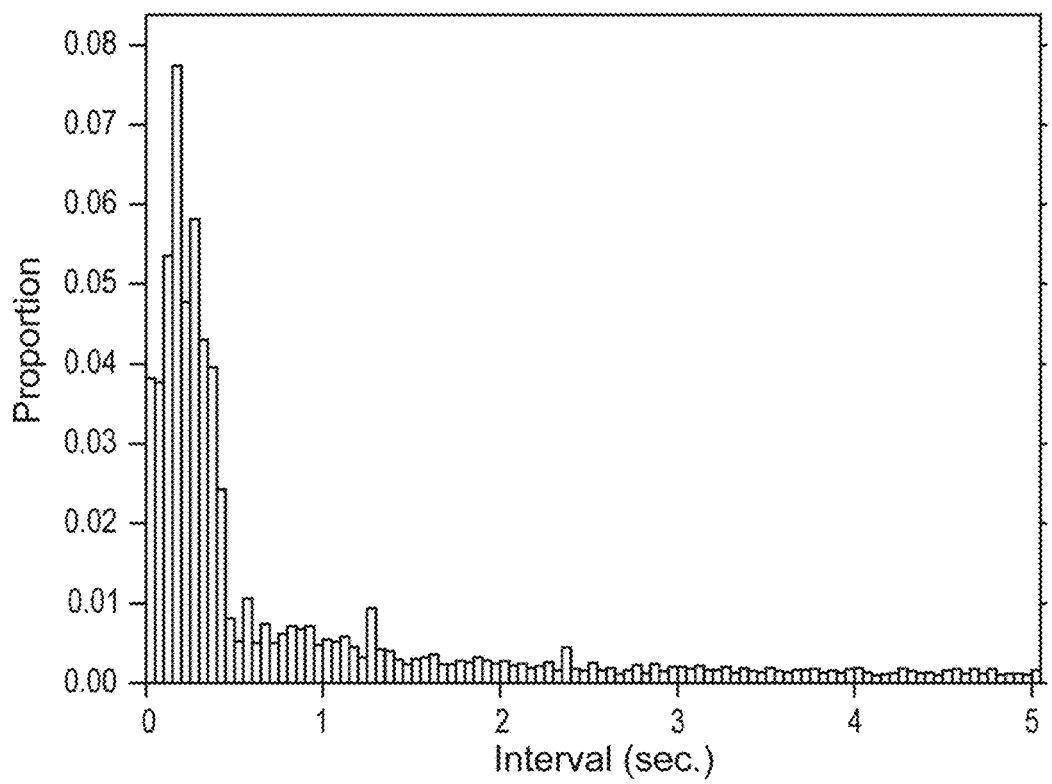
FIG. 3A illustrates another example signal diagram, according to certain example embodiments.
Figure 3B:
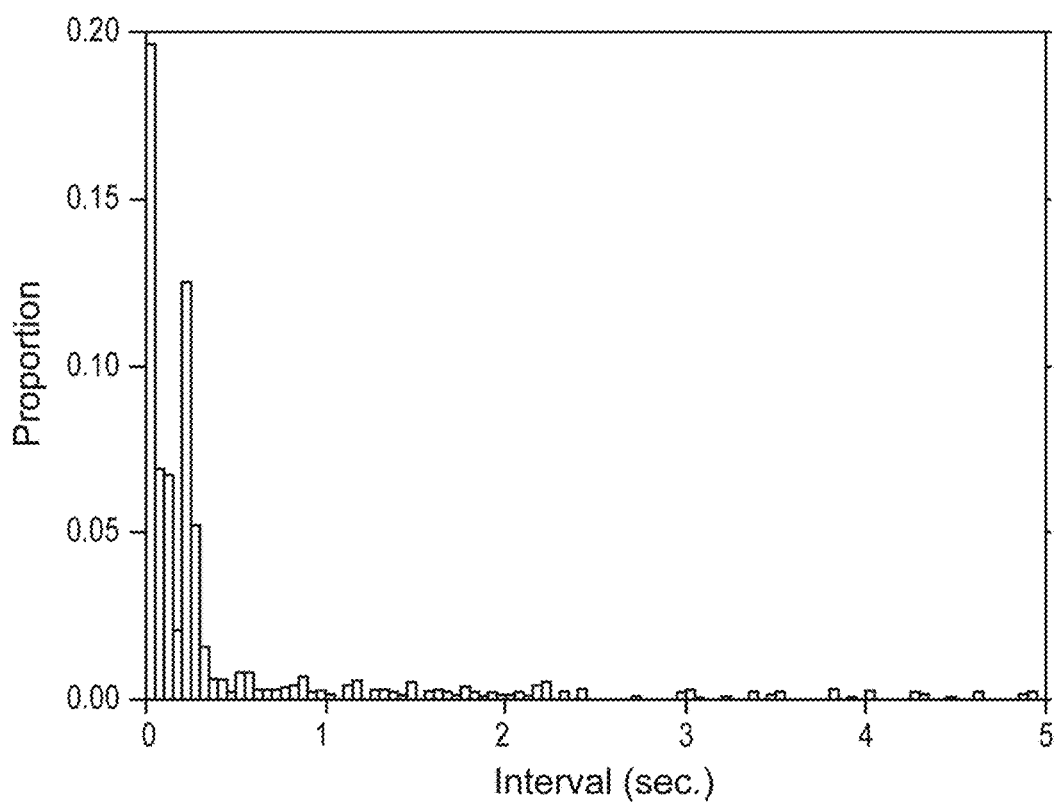
FIG. 3B illustrates another example behavior-based detection, according to certain example embodiments.

FIG. 3A illustrates results of an example behavior-based detection, according to certain example embodiments. For instance, FIG. 3A illustrates a distribution graph showing the proportion of the time delay (i.e., in increments of 0.05 seconds) between two events for human users. As illustrated in the example of FIG. 3A, human behavior may be mapped to proportion with respect to a time interval (seconds). For instance, the proportion may be a representation of a time delay rounded to the nearest 0.05 seconds. In contrast, FIG. 3B illustrates another example behavior-based detection, according to certain example embodiments. In particular, FIG. 3B illustrates a human mimicked bot behavior mapped to proportion with respect to a time interval (seconds). For instance, FIG. 3B illustrates a distribution graph showing the proportion of the time delay (i.e., in increments of 0.05 seconds) between two events for a bot script.

Additionally, FIG. 3C illustrates a table identifying example human and bot behaviors, according to certain example embodiments. For instance, FIG. 3C illustrates comparisons of signals that can be collected from monitoring a form, and how they can vary between human interaction and bot interaction. In some example embodiments, the data points defining human and bot behaviors when filling an online form may include, but not limited to, mouse movement, typing speed, keypress duration, backspace, tabbing, and autofill password manager. As illustrated in FIG. 3C, human behavior (compared to bot behavior) may be characterized by slow mouse movement, slow typing speed, long keypress duration, backspacing, tabbing, and implementing autofill password management. In contrast, bot behavior (as compared to human behavior) may exhibit fast and precise mouse movement, fast typing speed, short keypress duration, no backspacing, no tabbing, and no autofill password management. In certain example embodiments, the measurements of the events may correspond to the time duration between events. For example, if the time duration of a number of events that a human triggers were collected versus that of a bot triggers, a bot typing may show much faster than a human typing.

According to certain example embodiments, one or more signals of the various data points shown in FIG. 3C may be used as standalone signals if they are irregular. For example, all or most events having isTrusted may be set to false, which means that it is very likely to be a malicious activity. In other example embodiments, keypresses may have very short or exact time differences, which may mean that it is very likely that the event is determined to be malicious activity. In some example embodiments, a machine learning model may be utilized to reduce the amount of false positives, as it may continuously increase its accuracy.

It is noted that FIGS. 3A-3C are provided as some examples for purposes of illustration. However, it should be noted that certain embodiments are not limited to the examples depicted in FIGS. 3A-3C, and further examples are possible according to other embodiments.

Figure 4:
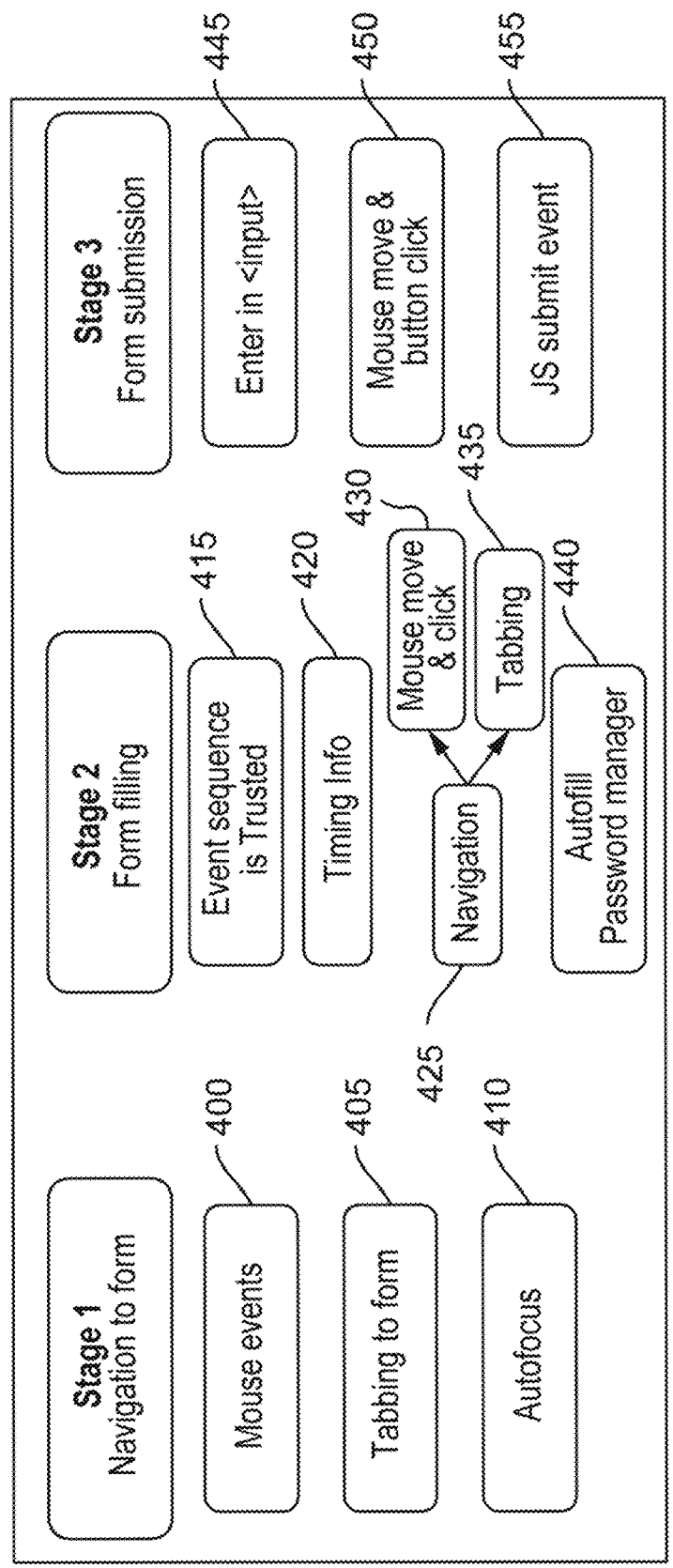
FIG. 4 illustrates an example sequence-based detection, according to certain example embodiments.

FIG. 4 illustrates an example sequence-based detection, according to certain example embodiments. In certain example embodiments, a sequence-based detection may include analyzing the sequence of events as compared to their expected user behavior. This may enable detection of events that cannot be normally performed by a human. For instance, the sequence of events may include navigating to the form, filling the form, and submitting the form. In certain example embodiments, various scenarios may exist for every step. For instance, according to some example embodiments, if filling the form took place with minimal delay between the keyboard events, this may be considered as malicious behavior. Furthermore, if navigation from one textbox to another textbox took place without tabbing or mouse click, this may be considered as a bot behavior. According to some example embodiments, once it is determined that malicious behavior or bot behavior is detected, an action may be taken at different locations. For example, at the user machine, additional challenges may be provided before bypassing the form. However, at the server end, the event may be flagged as malicious or blocked from being processed, or the IP may be blocked.

As illustrated in FIG. 4, a sequence-based detection may be directed to navigation to a form. In this navigation to form stage, the sequence of events may include mouse events 400, tabbing to the form 405, and autofocus 410. In other example embodiments, the sequence-based detection may be directed to form filling. In this form filling stage, the sequence of events may include events sequences that are trusted 415, timing information 420, navigation 425, and autofill password manager 440. In some example embodiments, the navigation 425 may include mouse movements and clicks 430 and tabbing 435. According to certain example embodiments, the sequence-based detection may be directed to form submission. For instance, according to some example embodiments, the sequence of events for form submission may include entering inputs 445, mouse movements and button clicks 450, and JS submission events 455.

Figure 5:
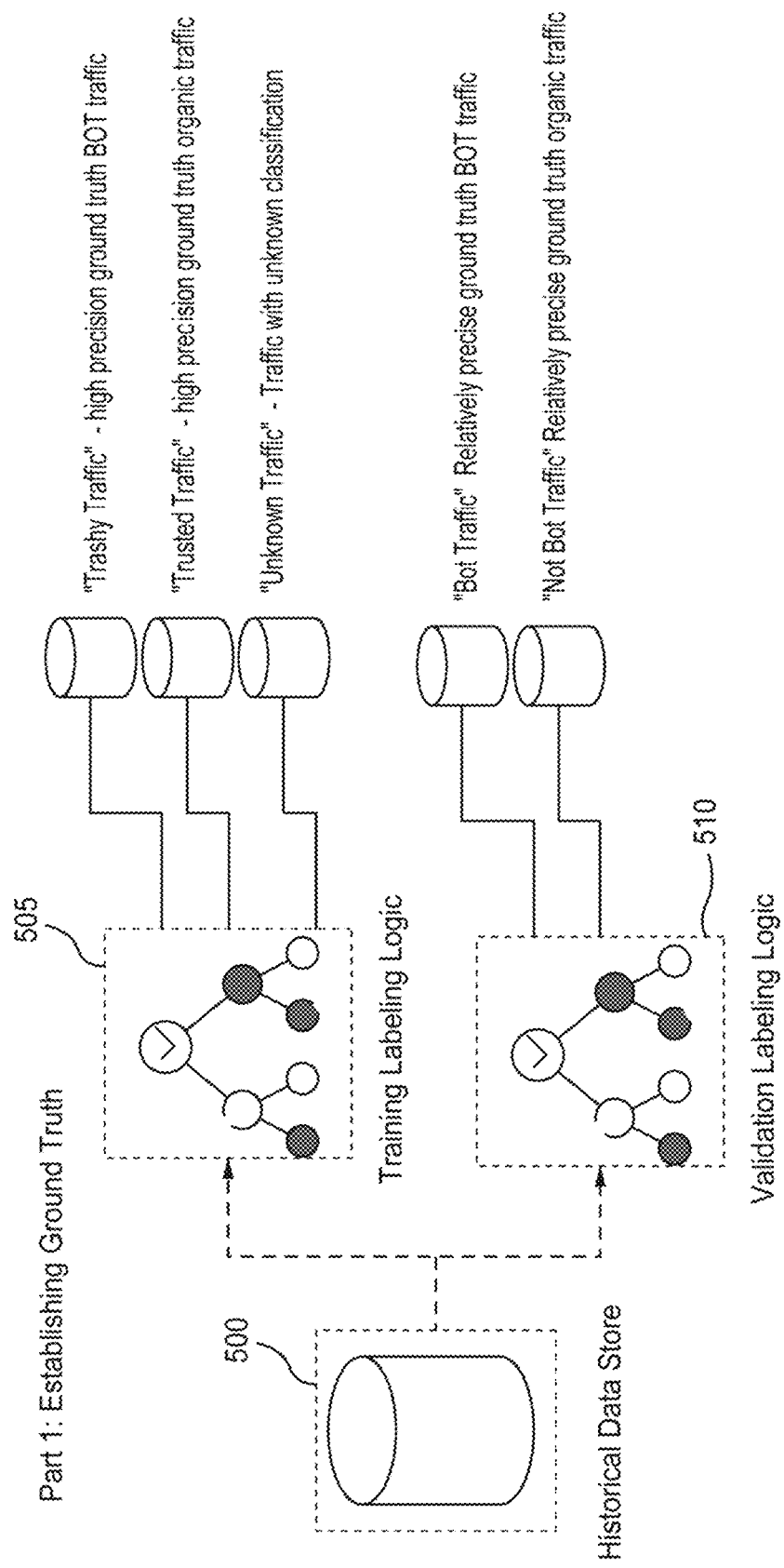
FIG. 5 illustrates an example procedure for establishing ground truth, according to certain example embodiments.

Further example embodiments may provide a method for detecting automated or bot behavior using machine learning and/or behavioral indicators. For example, certain example embodiments may provide a machine learning (ML) model that may be trained on features derived from key and mouse input data. An embodiment may be configured to build a semi-supervised ML model using ground truth(s). FIG. 5 illustrates an example procedure for establishing ground truth, according to certain example embodiments. The training procedure may begin by defining several classifications of ground truth for a training and validation label. As illustrated in FIG. 5, a historical data storage device 500 may include data upon which training labeling logic 505 and validation labeling logic may be applied. For instance, in some example embodiments, the historical data storage device 500 may include previously stored data corresponding to keyboard and mouse input data, which may be collected as described in detail elsewhere herein. With the stored data, the training labeling logic 505 may be used to derive classifications of highly precise ground truth bot traffic and organic traffic. For instance, in certain example embodiments, this precision may be good as a result of organizational processes. These processes, with a combination of automation and (infrequent) human judgment, label, annotate, and track bot operations. Additionally, the organizational processes may be what makes the labels precise.

As one example, a US centric music streaming website experiencing a sudden, large volume of comment spam from a specific set of datacenters. The human organizational process may label this as an attack and with automation, track that attack over time. Any traffic from this attack may serve as an example bot traffic for the ground truth in the training labeling logic 505. Additionally, traffic that is detected as bot that has not gone through the scrutiny of human review in the organizational process is not used as an example bot traffic in the training label logic 505.

According to certain example embodiments, fraud operations may be identified by various methods including, for example, high activity, anomalous traffic source, abnormal browser environment, etc., and may be labeled as "trashy traffic". Such a label may be a high precision ground truth bot traffic label with a potential additional sub-classification to specify attribution to a particular fraud operation. This "trashy traffic" may serve as ground truth for bot traffic, and may represent a subset of all observable bot traffic.

According to certain example embodiments, the high activity may refer to anomalously high activity for a given entity (e.g., an IP address, browser cookie, or user ID). The anomalous traffic source may include traffic to a web application that originates from a country that is inconsistent with the web applications primary user base, with potential in-organic traffic volume (i.e., sudden Vietnamese traffic experienced by a U.S. bank). Further, abnormal browser environment may include signs of browser impersonation (e.g., javascript or network properties of the browser are inconsistent with its declared user agent), or properties of the browser suggest a browser automation framework. Additionally, in other example embodiments, the obviously high activity may include 24 hours a day, 7 days a week activity from a single user ID.

As illustrated in FIG. 5, the "trashy traffic" may be compared to "trusted traffic", which may correspond to traffic that is highly likely to be organic (i.e., human traffic) due to several factors. In certain example embodiments, such factors may include exhibiting normal browser environments, originating from benign residential IPs, not exhibiting signs of a proxied connection, low activity, and unmarked from any current detection technique. This is a highly precise ground truth organic traffic label, and may represent a subset of all organic traffic. According to certain example embodiments, normal browser environments may correspond to browsers not exhibiting signs of browser impersonation or automation as stated above. Further, trusted traffic may refer to traffic where all of these benign "trusted traffic" conditions are satisfied. Further, trashy traffic may correspond to traffic where any and/or a subset of these very suspicious "trashy traffic" conditions are satisfied. The training labeling logic may also label certain traffic as "unknown traffic", which may pertain to traffic with an unknown classification. In some example embodiments, the unknown traffic may be disposed of to ensure that the ML model does not incorporate any incorrect or imprecise information.

As further illustrated in FIG. 5, the historical data store 500 may include validation labeling logic 510. In certain example embodiments, in implementing the validation labeling logic 510, each web application interaction may be given a "bot" or "not bot" validation label. "Bot" traffic may correspond to "trashy traffic" with some proportion of "unknown traffic". However, "not bot" traffic may correspond to "trusted traffic" with some proportion of "unknown traffic". In other example embodiments, less precise logic may be used to classify the unknown traffic into "bot" or "not bot" depending on signs of browser impersonation, browser automation, anomalous activity, etc.

According to certain example embodiments, a separate set of labeling logic may be used to derive a relatively precise ground truth bot traffic and organic traffic. According to certain example embodiments, this precision may be measured ad hoc through potential feedback from entities who block or add additional friction to traffic dependent on a decision. The false positive rate of "bot" traffic in certain example embodiments may be assumed to be relatively low (e.g., <0.1%), or else this may be extremely disruptive to entities (i.e., clients), and a client escalation may be raised.

Further, in certain example embodiments, the validation logic may differ from the training logic as far as the degree of organizational review in tracking bot operations. For instance, training logic 505 may use tracked bot operations (as bot examples; this may correspond to the trashy traffic referred to earlier) that have gone through organizational review (i.e., high precision). Traffic that is fairly sure is not bot traffic (i.e., trusted traffic) may also be used. Of the three categories trusted, unknown, and trashy, the trusted and trashy traffic may be used, but not the unknown traffic. Additionally, the validation logic 510 may include bot traffic that is detected, but has not gone through the bot operation tracking process. Although the bot traffic has not gone through the bot operation tracking process, it may still be relatively precise, but somewhat lower than the training logic. Here, trusted, trashy, and unknown traffic may be used to evaluate the model's performance since it best simulates how the model will be used since not every bot session may meet the criteria to be labeled as an attack and go through organizational review to be tracked.

According to certain example embodiments, the labeling logic may label all examples of traffic. According to other example embodiments, the data in the validation labeling logic may be used to evaluate the model at the end. In other words, all traffic may be evaluated to determine whether any issues or problems exist. For instance, in some example embodiments, the validation labeling logic 510 may be used to determine and/or evaluate if the ML model is performing relatively well. According to certain example embodiments, the ML model may be measured using ground truth derived from the validation logic, and the ML model may be assumed to be performing relatively well if the precision is, for example, >95% at some minimum recall (e.g., >50%). The 5% gap in precision may be due to model error, or it may be due to the gaps in the validation logic. If there is a commonality in model errors (such as all model errors occur for a particular browser), certain example embodiments may investigate and improve the validation logic and labeling. Thus, in certain example embodiments, a prevision of 95% may mean that all sessions labeled bot are very likely to be bot. Additionally, a recall of at least 50% may mean that 50% of the sessions that are truly bot traffic, are labeled as bot.

In certain example embodiments, the high precision labels may be used to train the ML model, but not the relatively precise labels. However, in other example embodiments, the relatively precise labels may be brought back when evaluating the ML model. For instance, when the ML model is evaluated, the best data may be used, which might also include some "trashy traffic". This may make it possible to determine when the ML model misclassified any features, and determine if the misclassification was due to the "trashy traffic" or if the ML model is not performing as expected (i.e., underperforming).

Figure 6:
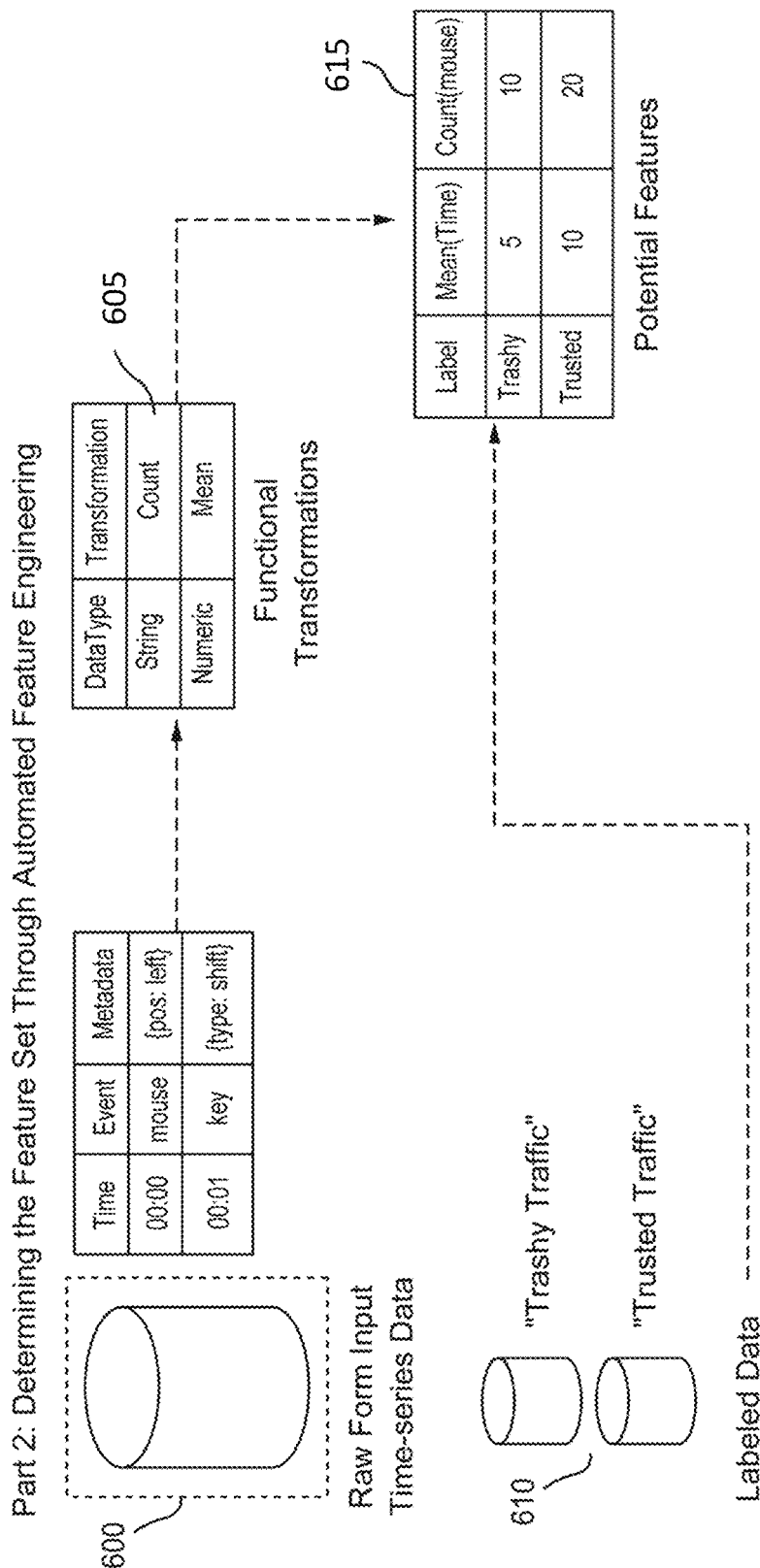
FIG. 6 illustrates an example procedure for determining a feature set, according to certain example embodiments.

FIG. 6 illustrates an example procedure for determining a feature set, according to certain example embodiments. For instance, at 600, raw time-series data of collected mouse and keyboard events, timing, and associated metadata may be collected. In certain example embodiments, such data may be collected in any one or a combination of manner(s) described above with respect to events associated with online forms and/or webpages, and with respect to certain example embodiments illustrated in FIGS. 1-4. In other example embodiments, such data may be searched for high information features for a ML algorithm. As illustrated in FIG. 6, the metadata for mouse events may include, for example, positioning of the mouse, and the metadata for the keyboard events may include, for example, typing or specific key functions (e.g., "SHIFT").

In certain example embodiments, the raw time-series data may relate to operations that are performed in a particular point(s) in time on a webpage. At 605, it may be possible to perform transformations on the raw time-series data. For example, if the data is numeric data, a mean of the time between keystrokes may be performed. However, if the data is categorical data (i.e., string) such as, for example, mousekey events, counts of a number of mouse movements that were performed may be obtained. Other example embodiments may obtain a percentage of mouse movements that were on a webpage (e.g., the mouse was moved for 50% of the events that were performed on a webpage). At 615, the labeled data from 610 may be used in combination with the results of the functional transformations 605 to obtain a table of potential features that maps certain "trashy traffic" and "trusted traffic" with corresponding mean values and count values. In certain example embodiments, the table of potential features that maps certain "trashy traffic" and "trusted traffic" may be measures of variance, distributional measures such as skew or kurtosis, min, max, etc. The labeled data from 610 may be used in combination with the results of the functional transformations 605 to train the ML model, enabling the ML model to learn relationships between the data automatically.

In certain example embodiments, from 615 of FIG. 6, the labeled data from 610 may be used to perform feature selection on the potential features from 615. Tends of thousands of potential features may be present in 615, and only features that have some information value at separating "trashy traffic" from "trusted traffic" may be selected for use in the ML model. In certain example embodiments, this information value may be evaluated using entropy, gini impurity, chi squared statistic, or other methods. The output of this step may result in a subset of potential features for ML model training.

Additionally, in certain example embodiments, the ML model may be trained on this subset of potential features (see FIG. 7), at which time the ML model may be learning relationships. By learning relationships, the ML model may determine the optimal decision boundary between observations of "trusted traffic" and "trashy traffic". The decision boundary may correspond to the optimal set of conditions from the set of features that maximizes the performance of the model. As one example, in a simple case (one feature: number of mouse presses), this decision boundary may be mouse presses >5.

According to certain example embodiments, a diverse feature set may be developed using domain expertise of common browser automation environments, and case studies on fraud operations that are considered distinct due to their environment, sophistication, and targeted customer. According to some example embodiments, the feature set may include a numeric representation set of important characteristics or metadata for a given webpage interaction. Examples of such features in this feature set may include, but not limited to: mean time between keypresses; minimum time between any keypress and a copy keypress; count of mouse moves; count of mouse move to shift key press sequence; mean time between mouse move to shift key press sequence; percent of key presses that occur on a shift key;

and return 1 if a certain key type was ever pressed, else 0. Thus, in some example embodiments, the features may refer to a specific keyboard and/or mouse event that took place, or capture the trend of keyboard and/or mouse events and their metadata over the course of web interaction.

In certain example embodiments, from the case studies, features may be determined automatically by exhaustively applying aggregation functions to various aspects of the time-series of keyboard and mouse inputs over the course of a webpage interaction. For instance, by applying mean, median, and standard deviation to all numeric data, such as the time between keypresses. In some example embodiments, the importance of these features may be measured through information gain, and a subset of highly informative features may be used as inputs into the resulting ML model.

FIG. 7 illustrates an example model training and validation procedure, according to certain example embodiments. As illustrated in FIG. 7, at 700, the labels and potential features obtained from the example procedure of FIG. 6 may be used as potential outcomes in the example model training and validation procedure in FIG. 7. That is, the labels may be taken as outcomes, and the features are potential indicators of these outcomes, allowing the ML model to determine (i.e., be trained) relationships that lead to the outcome. In some example embodiments, the ML model may be used to obtain certain results including, for example, identification of bot traffic or human traffic.

According to certain example embodiments, if it is unknown whether the potential features in FIG. 6 are bot or not bot, the trained ML model may determine whether or not the features are bot or not bot. For instance, in certain example embodiments, the ML model may be trained using the subset of traffic where this is highly precise ground truth. A binary class label may be constructed for a subset of the traffic using "Trusted Traffic" and "Trashy Traffic" sources, as illustrated in FIG. 7. The resulting model may then be evaluated on all of the traffic with slightly less reliable ground truth of "bot" and "Not Bot" binary classification.

At 705, validation/error analysis may be performed. According to certain example embodiments, error analysis may include evaluating less reliable ground truth. For instance, in certain example embodiments, the error analysis may be performed by examining metrics such as one or a combination of one or more of false positive rate, area under the receiver operating curve, area under the precision recall curve partitioned by browser environments, ISPs, and other key aspects of the data to look for characteristic false positives. In particular, at 705, a validation metrics curve may be provided, which shows a precision recall curve to evaluate the ML algorithm. If the number is 1, the ML algorithm may be classified as a precise algorithm, whereas if the number is 2, the algorithm may be classified as an imprecise algorithm. As an imprecise algorithm it may be present a bad example of evaluation results of the trained model. Thus, according to certain example embodiments, it may be possible to understand if resulting errors in the model are results of potential mixed classifications or potential mislabeling of "Bot" or "Not Bot" (i.e., there is not enough heuristics to label it correctly). Furthermore, potential misclassifications may be studied by observing the difference in instance level feature importance through the Shapley Additive exPlanations (SHAP) technique. This technique may ensure that even though the model may not be trained on all instances of the data, the fact that it is trained on a representative sample of traffic with highly precise ground truth, leads to an unbiased classifier that is able to generalize to all observations. This technique may also provide the ability to understand the reasons why certain data was misclassified (e.g., excessive mouse movement).

Figure 8:
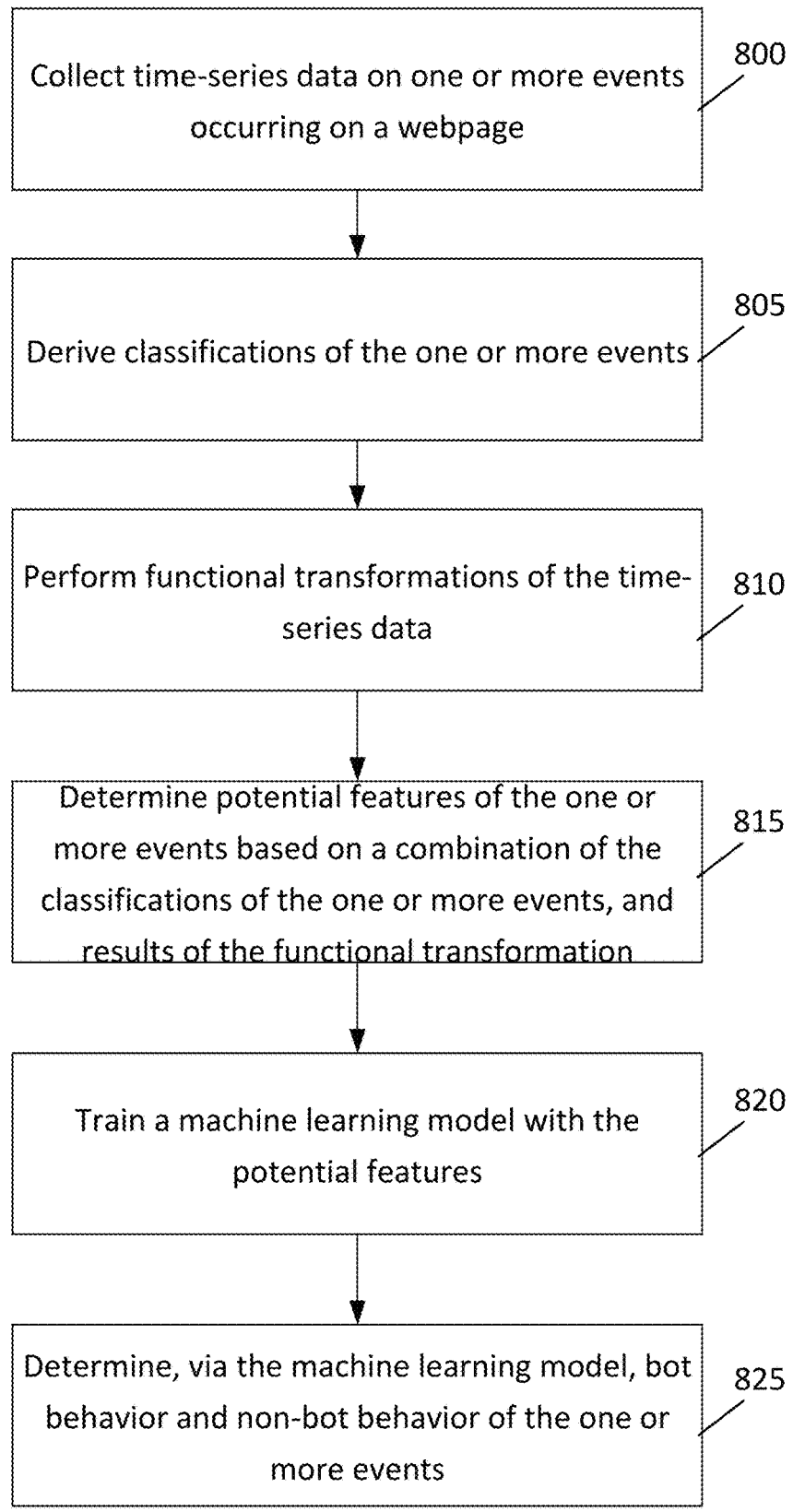
FIG. 8 illustrates an example flow diagram of a method, according to certain example embodiments.

FIG. 8 illustrates an example flow of a method, according to certain example embodiments. In an example embodiment, the method of FIG. 8 may be performed by a computing device. For instance, in an example embodiment, the method of FIG. 8 may be performed by a computer, server, or mobile computing device that may be similar to or included in apparatus 10 illustrated in FIG. 10. It should be noted that one of ordinary skill in the art would understand that apparatus 10 may include components or features not shown in FIG. 10.

According to certain example embodiments, the method of FIG. 8 may include, at 800, collecting time-series data on one or more events occurring on a webpage. At 805, the method may also include deriving classifications of the one or more events. At 810, the method may further include performing functional transformations of the time-series data. In addition, at 815, the method may include determining potential features of the one or more events based on a combination of the classifications of the one or more events, and results of the functional transformation. Further, at 820, the method may include training a machine learning model with the potential features. At 825, the method may also include determining, via the machine learning model, bot behavior and non-bot behavior of the one or more events.

According to certain example embodiments, the method may further include receiving an array of the one or more events and timing between each of the one or more events, and determining, with the machine learning model based on the array, existence of bot behavior or non-bot behavior. According to some example embodiments, the method may further include determining whether the one or more events comprises numeric data or categorical data, and performing a mean transformation or a count transformation based on the determination. According to other example embodiments, the mean transformation may include performing a mean of a time between keystrokes operations in the webpage, and the count transformation may include counting a number of mouse movements performed in the webpage out of a total number of events performed in the webpage.

In certain example embodiments, the method may further include applying a validation logic to the one or more events and the machine learning model. In some example embodiments, the validation logic may include performing an error analysis. In other example embodiments, during the error analysis, the method further include examining metrics comprising false positive rate, area under a receiver operating curve, area under a precision recall.

Figure 9:
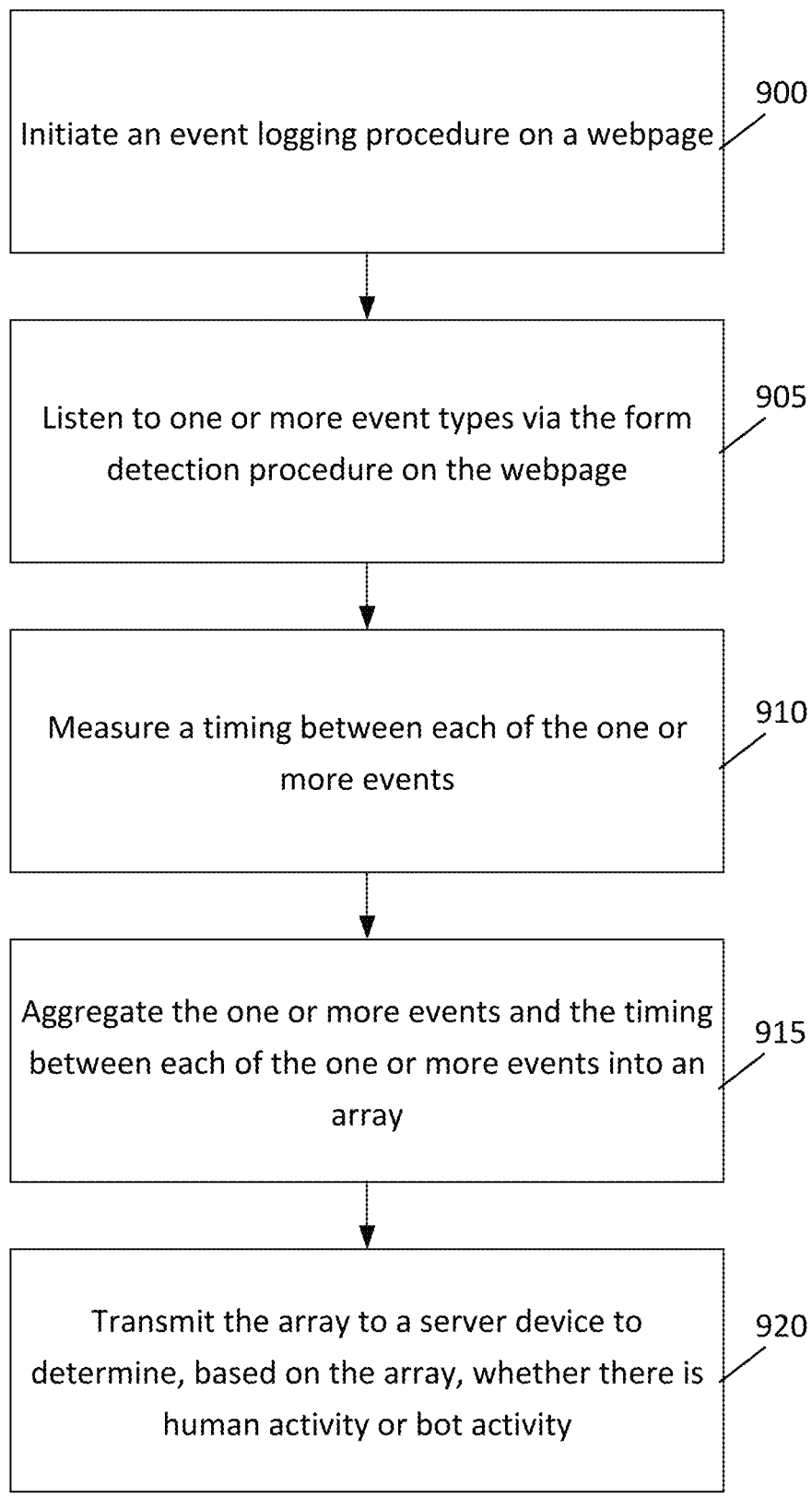
FIG. 9 illustrates an example flow diagram of another method, according to certain example embodiments.

FIG. 9 illustrates an example flow diagram of another method, according to certain example embodiments. In an example embodiment, the method of FIG. 9 may be performed by a computing device. For instance, in an example embodiment, the method of FIG. 9 may be performed by a computer, server, or mobile computing device that may be similar to or included in apparatus 20 illustrated in FIG. 10. It should be noted that one of ordinary skill in the art would understand that apparatus 20 may include components or features not shown in FIG. 10.

According to certain example embodiments, the method of FIG. 9 may include, at 900, initiating an event logging procedure on a webpage. The method may also include, at 905, listening to one or more event types via the form detection procedure on the webpage. The method may further include, at 910, measuring a timing between each of the one or more events. In addition, the method may include, at 915, aggregating the one or more events and the timing between each of the one or more events into an array. Further, the method may include, at 920, transmitting the array to a server device to determine, based on the array, whether there is human activity or bot activity.

According to certain example embodiments, the mouse event may include a mouse-up operation, a mouse-down operation, a mouse-out operation, a mouse-over, or a click operation. According to some example embodiments, the keyboard event may include a key-down operation or a key-up operation. According to other example embodiments, the input event may include a paste operation, a select operation, or an input operation.

In certain example embodiments, the input operation may include an insert, a delete, a history, or a format operation. In further example embodiments, the timing may be a maximum of 1024 ms between each of the one or more events. In some example embodiments, the array may include an aggregate of the one or more event types versus a key status. In other example embodiments, the array may include an aggregate of the one or more event types versus a key status. In further example embodiments, the array may include an aggregate of the one or more event types versus a change between a current event and a previous event. According to certain example embodiments, the webpage may be JavaScript enabled.

Figure 10:
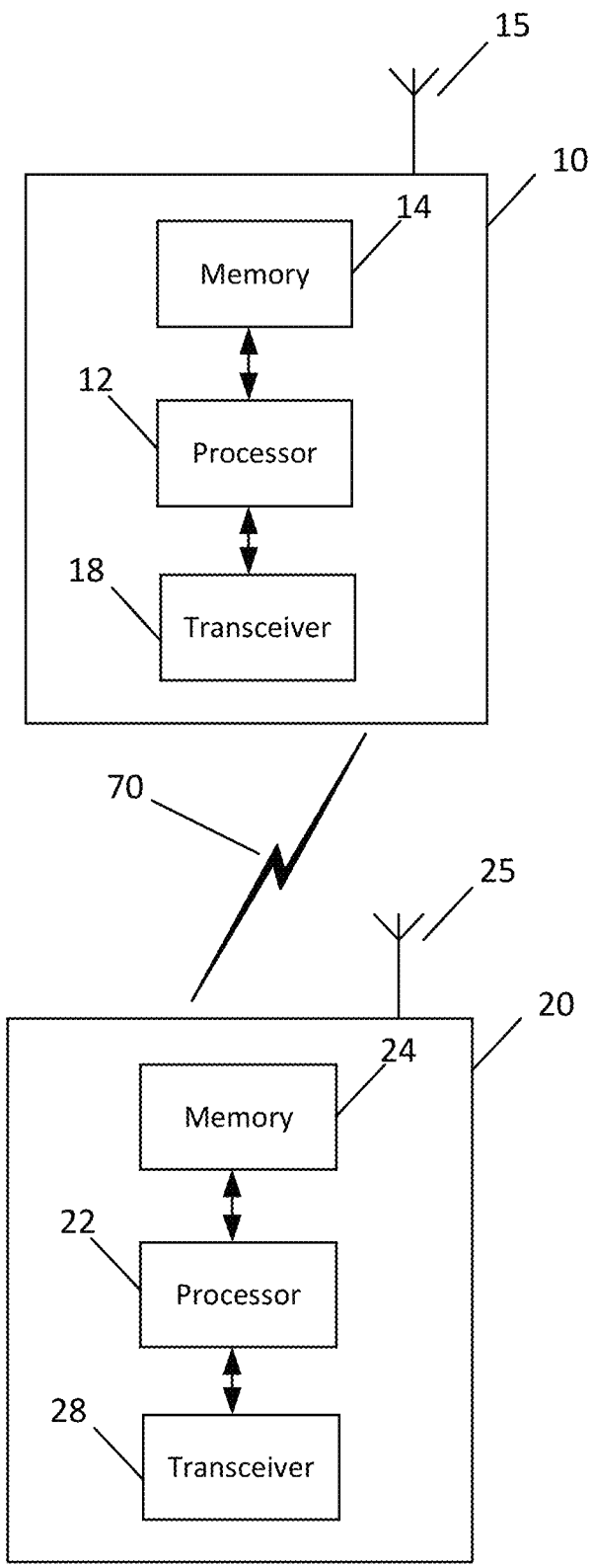
FIG. 10 illustrates an apparatus, according to certain example embodiments.

FIG. 10 illustrates a set of apparatuses 10 and 20 according to certain example embodiments. In certain example embodiments, apparatuses 10, 20 may be a computer, mobile computing device, network device, server, or other similar device. It should be noted that one of ordinary skill in the art would understand that apparatuses 10, 20 may include components or features not shown in FIG. 10.

In some example embodiments, apparatuses 10, 20 may include one or more processors, one or more computer-readable storage medium (for example, memory, storage, or the like), one or more radio access components (for example, a modem, a transceiver, or the like), and/or a user interface. It should be noted that one of ordinary skill in the art would understand that apparatuses 10, 20 may include components or features not shown in FIG. 10.

As illustrated in the example of FIG. 10, apparatuses 10, 20 may include or be coupled to processors 12, 22 for processing information and executing instructions or operations. Processors 12, 22 may be any type of general or specific purpose processor. In fact, processors 12, 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12, 22 is shown in FIG. 10, multiple processors may be utilized according to other example embodiments. For example, it should be understood that, in certain example embodiments, each of apparatuses 10, 20 may include two or more processors that may form a multiprocessor system (e.g., in this case processors 12, 22 may represent a multiprocessor) that may support multiprocessing. According to certain example embodiments, the multiprocessor system may be tightly coupled or loosely coupled (e.g., to form a computer cluster).

Processors 12, 22 may perform functions associated with the operation of apparatuses 10, 20 including, as some examples, precoding of antenna gain/phase parameters, encoding and decoding of individual bits forming a communication message, formatting of information, and overall control of the apparatuses 10, 20, including processes illustrated in FIGS. 1-9.

Apparatuses 10, 20 may further include or be coupled to memories 14, 24 (internal or external), which may be coupled to processors 12, 22, for storing information and instructions that may be executed by processors 12, 22. Memories 14, 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memories 14, 24 can be comprised of any combination of random access memory (RAM), read only memory (ROM), static storage such as a magnetic or optical disk, hard disk drive (HDD), or any other type of non-transitory machine or computer readable media. The instructions stored in memories 14, 24 may include program instructions or computer program code that, when executed by processors 12, 22, enable the apparatuses 10, 20 to perform tasks as described herein.

In certain example embodiments, apparatuses 10, 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processors 12, 22 and/or apparatuses 10, 20 to perform any of the methods illustrated in FIGS. 1-9.

In some example embodiments, apparatuses 10, 20 may also include or be coupled to one or more antennas 15, 25 for receiving a downlink signal and for transmitting via an uplink from apparatuses 10, 20. Apparatuses 10, 20 may further include a transceivers 18, 28 configured to transmit and receive information. The transceivers 18, 28 may also include a radio interface (e.g., a modem) coupled to the antennas 15, 25. The radio interface may include other components, such as filters, converters signal shaping components, and the like, to process symbols, carried by a downlink or an uplink.

For instance, transceivers 18, 28 may be configured to modulate information on to a carrier waveform for transmission by the antenna(s) 15, 25 and demodulate information received via the antenna(s) 15, 25 for further processing by other elements of apparatuses 10, 20. In other example embodiments, transceivers 18, 28 may be capable of transmitting and receiving signals or data directly. Additionally or alternatively, in some example embodiments, apparatuses 10, 20 may include an input and/or output device (I/O device). In certain example embodiments, apparatuses 10, 20 may further include a user interface, such as a graphical user interface or touchscreen. According to other example embodiments, apparatus 10 may optionally be configured to communicate with apparatus 20 (or vice versa) via a wireless or wired communication link 70.

In certain example embodiments, memories 14, 24 stores software modules that provide functionality when executed by processors 12, 22. The modules may include, for example, an operating system that provides operating system functionality for apparatuses 10, 20. The memories 14, 24 may also store one or more functional modules, such as an application or program, to provide additional functionality for apparatuses 10, 20. The components of apparatuses 10, 20 may be implemented in hardware, or as any suitable combination of hardware and software.

According to certain example embodiments, processors 12, 22 and memories 14, 24 may be included in or may form a part of processing circuitry or control circuitry. In addition, in some example embodiments, transceivers 18, 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of a hardware circuit or processor (or multiple processors), or portion of a hardware circuit or processor, and its accompanying software and/or firmware.

In certain example embodiments, apparatus 10 may be controlled by memory 14 and processor 12 to collect time-series data on one or more events occurring on a webpage. Apparatus 10 may also be controlled by memory 14 and processor 12 to derive classifications of the one or more events. Apparatus 10 may further be controlled by memory 14 and processor 12 to perform functional transformations of the time-series data. In addition, apparatus 10 may be controlled by memory 14 and processor 12 to determine potential features of the one or more events based on a combination of the classifications of the one or more events, and results of the functional transformation. Further, apparatus 10 may be controlled by memory 14 and processor 12 to train a machine learning model with the potential features. Apparatus 10 may also be controlled by memory 14 and processor 12 to determine, via the machine learning model, bot behavior and non-bot behavior of the one or more events.

According to other example embodiments, apparatus 20 may be controlled by memory 24 and processor 22 to initiate an event logging procedure on a webpage. Apparatus 20 may also be controlled by memory 24 and processor 22 to listen to one or more event types via the form detection procedure on the webpage. Apparatus 20 may further be controlled by memory 24 and processor 22 to measure a timing between each of the one or more events. In addition, apparatus 20 may be controlled by memory 24 and processor 22 to aggregate the one or more events and the timing between each of the one or more events into an array. Further, apparatus 20 may be controlled by memory 24 and processor 22 to transmit the array to a server device to determine, based on the array, whether there is human activity or bot activity.

In some example embodiments, an apparatus (e.g., apparatus 10) may include means for performing a method, a process, or any of the variants discussed herein. Examples of the means may include one or more processors, memory, controllers, transmitters, receivers, sensors, and/or computer program code for causing the performance of the operations.

Certain example embodiments may further be directed to an apparatus that includes means for performing any of the methods described herein including, for example, means for collecting time-series data on one or more events occurring on a webpage. The apparatus may also include means for deriving classifications of the one or more events. The apparatus may further include means for performing functional transformations of the time-series data. In addition, the apparatus may include means for determining potential features of the one or more events based on a combination of the classifications of the one or more events, and results of the functional transformation. Further, the apparatus may include means for training a machine learning model with the potential features. The apparatus may also include means for determining, via the machine learning model, bot behavior and non-bot behavior of the one or more events.

Other example embodiments may be directed to an apparatus that includes means for initiating an event logging procedure on a webpage. The apparatus may also include means for listening to one or more event types via the form detection procedure on the webpage. The apparatus may further include means for measuring a timing between each of the one or more events. In addition, the apparatus may include means for aggregating the one or more events and the timing between each of the one or more events into an array. Further, the apparatus may include means for transmitting the array to a server device to determine, based on the array, whether there is human activity or bot activity.

Certain example embodiments described herein provide several technical improvements, enhancements, and/or advantages. In some example embodiments, it may be possible to search for all potential features using all combinations of functional transformations and all collected metadata bout keyboard, mouse events, and their trends over the course of a web interaction. This may provide the ability to generate tens of thousands of potential features automatically, and quickly find informative features for an ML model. In other example embodiments, it may be possible to label web interactions based on a set of training logic that includes browser impersonation, automation, proxy, and behavioral anomalies to train an ML model. In doing so, it may be possible to perform feature selection to compute highly informative features for ML training.

In other example embodiments, it may be possible to support touch events. It may also be possible to track navigation path(s) (e.g., moving from username field to input field). In other example embodiments, it may be possible to encrypt data sent back, and use custom encryption/compression to use less space.

As described herein, a computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of code may be in a source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments.

I claim:

1. An apparatus, comprising:
   at least one processor; and
   at least one memory comprising computer program code,
   the at least one memory and the computer program code are configured, with the at least one processor, to cause the apparatus at least to
   collect time-series data on one or more events occurring on a webpage;
   derive classifications of the one or more events;
   perform functional transformations of the time-series data;
   determine potential features of the one or more events based on a combination of the classifications of the one or more events, and results of the functional transformation;
   train a machine learning model with the potential features;
   determine, via the machine learning model, bot behavior and non-bot behavior of the one or more events; and
   determine characteristics of false positives of the machine learning model by applying a validation logic to the one or more events and the machine learning model.

2. The apparatus according to claim 1, wherein the at least one memory and the computer program code are further configured, with the at least one processor, to cause the apparatus at least to:
   receive an array of the one or more events and timing between each of the one or more events; and
   determine, with the machine learning model based on the array, existence of bot behavior or non-bot behavior.

3. The apparatus according to claim 1, wherein the functional transformations comprises the at least one memory and the computer program code being further configured, with the at least one processor, to cause the apparatus at least to:
   determine whether the one or more events comprises numeric data or categorical data; and
   perform a mean transformation or a count transformation based on the determination.

4. The apparatus according to claim 3,
   wherein the mean transformation comprises performing a mean of a time between keystrokes operations in the webpage, and
   wherein the count transformation comprises counting a number of mouse movements performed in the webpage out of a total number of events performed in the webpage.

5. An apparatus, comprising:
   at least one processor; and
   at least one memory comprising computer program code,
   the at least one memory and the computer program code are configured, with the at least one processor, to cause the apparatus at least to
   collect time-series data on one or more events occurring on a webpage;
   derive classifications of the one or more events;
   perform functional transformations of the time-series data;
   determine potential features of the one or more events based on a combination of the classifications of the one or more events, and results of the functional transformation;
   train a machine learning model with the potential features;
   determine, via the machine learning model, bot behavior and non-bot behavior of the one or more events; and
   apply a validation logic to the one or more events and the machine learning model,
   wherein the validation logic comprises performing an error analysis, and
   wherein during the error analysis, the at least one memory and the computer program code are further configured, with the at least one processor, to cause the apparatus at least to examine metrics comprising false positive rate, area under a receiver operating curve, area under a precision recall curve partitioned by browser environments, and internet service providers.

6. A method, comprising:
   collecting time-series data on one or more events occurring on a webpage;
   deriving classifications of the one or more events;
   performing functional transformations of the time-series data;
   determining potential features of the one or more events based on a combination of the classifications of the one or more events, and results of the functional transformation;
   training a machine learning model with the potential features;
   determining, via the machine learning model, bot behavior and non-bot behavior of the one or more events; and
   determining characteristics of false positives of the machine learning model by applying a validation logic to the one or more events and the machine learning model.

7. The method according to claim 6, further comprising:
   receiving an array of the one or more events and timing between each of the one or more events; and
   determining, with the machine learning model based on the array, existence of bot behavior or non-bot behavior.

8. The method according to claim 6, further comprising:
   determining whether the one or more events comprises numeric data or categorical data; and
   performing a mean transformation or a count transformation based on the determination.

9. The method according to claim 8,
wherein the mean transformation comprises performing a mean of a time between keystrokes operations in the webpage, and
wherein the count transformation comprises counting a number of mouse movements performed in the webpage out of a total number of events performed in the webpage.

10. A method, comprising:
collecting time-series data on one or more events occurring on a webpage;
deriving classifications of the one or more events;
performing functional transformations of the time-series data;
determining potential features of the one or more events based on a combination of the classifications of the one or more events, and results of the functional transformation;
training a machine learning model with the potential features;
determining, via the machine learning model, bot behavior and non-bot behavior of the one or more events; and
applying a validation logic to the one or more events and the machine learning model,
wherein the validation logic comprises performing an error analysis, and
wherein during the error analysis, the method further comprises examining metrics comprising false positive rate, area under a receiver operating curve, area under a precision recall.

11. A computer program, embodied on a non-transitory computer readable medium, the computer program comprising computer executable code, which, when executed by a processor, causes the processor to:
collect time-series data on one or more events occurring on a webpage;
derive classifications of the one or more events;
perform functional transformations of the time-series data;
determine potential features of the one or more events based on a combination of the classifications of the one or more events, and results of the functional transformation;
train a machine learning model with the potential features;
determine, via the machine learning model, bot behavior and non-bot behavior of the one or more events; and
determine characteristics of false positives of the machine learning model by applying a validation logic to the one or more events and the machine learning model.

12. The computer program according to claim 11, wherein the processor is further caused to:
receive an array of the one or more events and timing between each of the one or more events; and
determine, with the machine learning model based on the array, existence of bot behavior or non-bot behavior.

13. The computer program according to claim 11, wherein the functional transformations comprises causing the processor to:
determine whether the one or more events comprises numeric data or categorical data; and
perform a mean transformation or a count transformation based on the determination.

14. The computer program according to claim 13,
wherein the mean transformation comprises performing a mean of a time between keystrokes operations in the webpage, and
wherein the count transformation comprises counting a number of mouse movements performed in the webpage out of a total number of events performed in the webpage.

15. A computer program, embodied on a non-transitory computer readable medium, the computer program comprising computer executable code, which, when executed by a processor, causes the processor to:
collect time-series data on one or more events occurring on a webpage;
derive classifications of the one or more events;
perform functional transformations of the time-series data;
determine potential features of the one or more events based on a combination of the classifications of the one or more events, and results of the functional transformation;
train a machine learning model with the potential features;
determine, via the machine learning model, bot behavior and non-bot behavior of the one or more events; and
apply a validation logic to the one or more events and the machine learning model,
wherein the validation logic comprises performing an error analysis, and
wherein during the error analysis, the processor is further caused to examine metrics comprising false positive rate, area under a receiver operating curve, area under a precision recall.

\* \* \* \* \*